(12) United States Patent
Ehrenberg

(10) Patent No.: US 9,213,658 B1
(45) Date of Patent: Dec. 15, 2015

(54) CHANGING MEMORY ACCESS FOR INSTRUCTION BASED ON MEMORY ACCESS MISSES

(71) Applicant: Google Inc., Mountain View, CA (US)

(72) Inventor: Daniel Ari Ehrenberg, San Francisco, CA (US)

(73) Assignee: Google Inc., Mountain View, CA (US)

( * ) Notice: Subject to any disclaimer, the term of this patent is extended or adjusted under 35 U.S.C. 154(b) by 502 days.

(21) Appl. No.: 13/771,960

(22) Filed: Feb. 20, 2013

(51) Int. Cl.
*G06F 13/28* (2006.01)

(52) U.S. Cl.
CPC ...................................... *G06F 13/28* (2013.01)

(58) Field of Classification Search
None
See application file for complete search history.

(56) References Cited

U.S. PATENT DOCUMENTS

| | | | | |
|---|---|---|---|---|
| 7,165,144 B2* | 1/2007 | Choubal | ............. | G06F 12/0835 711/118 |
| 7,788,448 B2* | 8/2010 | Spitzer | ................ | G06F 12/0875 711/118 |
| 7,848,322 B2* | 12/2010 | Oved | ...................... | H04L 69/16 370/389 |
| 7,864,787 B2* | 1/2011 | Oved | ...................... | G06F 9/541 370/389 |
| 8,108,538 B2* | 1/2012 | Oved | ...................... | G06F 9/542 709/200 |
| 8,244,902 B2* | 8/2012 | Oved | ...................... | G06F 9/542 709/200 |
| 2003/0225949 A1* | 12/2003 | Hoang | .................... | G06F 13/28 710/22 |
| 2007/0162705 A1* | 7/2007 | Spitzer | .................... | G06F 13/28 711/118 |
| 2008/0086598 A1* | 4/2008 | Maron | .................. | G06F 12/126 711/133 |
| 2008/0240130 A1* | 10/2008 | Oved | ...................... | G06F 9/541 370/401 |
| 2008/0240154 A1* | 10/2008 | Oved | ...................... | H04L 69/16 370/466 |
| 2009/0024817 A1* | 1/2009 | Oved | ...................... | G06F 13/28 711/170 |
| 2010/0049821 A1* | 2/2010 | Oved | ...................... | G06F 9/542 709/212 |
| 2011/0142043 A1* | 6/2011 | Oved | ...................... | G06F 9/541 370/390 |
| 2012/0096105 A1* | 4/2012 | Oved | ...................... | G06F 9/542 709/212 |

OTHER PUBLICATIONS

Simmonds, "The Embedded Linux Quick Start Guide: Kernel and User Space", Embedded Linux Conference Europe 2010, 30 pages.
"Linux Programmer's Manual", Jun. 20, 2010, 7 pages.
"NVM Express", Revision 1.0b, Jul. 12, 2011, 126 pages.
Wimmer, "Automatic Object Inlining in a Java Virtual Machine", Thesis, Institute for System Software, Johannes Kepler University Linz, Feb. 2008, 167 pages.

\* cited by examiner

*Primary Examiner* — Edward Dudek, Jr.
*Assistant Examiner* — Christopher D Birkhimer
(74) *Attorney, Agent, or Firm* — Brake Hughes Bellermann LLP

(57) ABSTRACT

A non-transitory computer-readable storage medium may include instructions stored thereon. When executed by at least one processor, the instructions may be configured to cause a computing system to at least maintain a count of memory misses associated with an instruction, the instruction being included in code associated with an application, and grant the instruction direct access to memory, bypassing an operating system running on the computer, based on the count of memory misses meeting or exceeding a threshold.

20 Claims, 6 Drawing Sheets

US 9,213,658 B1

CHANGING MEMORY ACCESS FOR INSTRUCTION BASED ON MEMORY ACCESS MISSES

TECHNICAL FIELD

This description relates to memory access.

BACKGROUND

Computing systems may have hierarchical memory, which may include multiple levels such as registers, cache, random access memory (RAM), flash memory, and disk. Memory devices at the top of the hierarchy may provide faster memory access, but may not have sufficient storage capacity to store all of the data and/or instructions needed by all applications running on the computing system. Also, in such hierarchical memory systems, each of the memory components may have its own addressing scheme.

Virtual memory may allow programs to access multiple levels of a given memory hierarchy. Such virtual memory may provide a single addressing scheme for applications (e.g., user applications), and map memory addresses from this single addressing scheme to the multiple levels of the memory hierarchy. However, the mapping or translation of virtual memory addresses to the addresses in the memory devices may adversely affect performance of associated applications.

SUMMARY

According to one general aspect, a non-transitory computer-readable storage medium may include instructions stored thereon. When executed by at least one processor, the instructions may be configured to cause a computing system to at least maintain a count of memory misses associated with an instruction, the instruction being included in code associated with an application, and grant the instruction direct access to memory, bypassing an operating system running on the computer, based on the count of memory misses meeting or exceeding a threshold.

According to another general aspect, a non-transitory computer-readable storage medium may include instructions stored thereon. When executed by at least one processor, the instructions may be configured to cause a computing system to at least maintain a count of memory misses associated with an instruction, the instruction being included in code associated with an application and including an operating system call to read data, and modify the instruction, based on the count of memory misses associated with the instruction meeting or exceeding a threshold, so that the instruction includes a read of the data directly from a memory device instead of the operating system call.

According to another general aspect, an apparatus may include at least one processor and at least one non-transitory computer-readable storage medium comprising instructions stored thereon. When executed by at the least one processor, the instructions may be configured to cause the apparatus to at least maintain a count of memory misses associated with an instruction, the instruction being included in code associated with an application, and grant the instruction direct access to memory, bypassing an operating system running on the computer, based on the count of memory misses meeting or exceeding a threshold.

The details of one or more implementations are set forth in the accompanying drawings and the description below. Other features will be apparent from the description and drawings, and from the claims.

DETAILED DESCRIPTION

Instructions in code for an application may instruct a processor to access memory, such as by performing read and write operations. These instructions may interface with physical memory via virtual memory. A virtual memory may map virtual addresses to addresses of multiple physical memory devices. When an instruction requests access to a virtual memory address for which the data is not presently stored in a higher (in a memory hierarchy) and/or faster memory device, the access request may be considered to "miss," requiring the data associated with the virtual memory address to be retrieved from a lower (in the memory hierarchy) and/or slower memory device. Retrieving the data from the lower and/or slower memory device and writing the data to the higher and/or faster memory device in association with the misses may take considerable time and slow down operation of the application that requests the memory operation (as well as other applications). The memory access misses may create overhead and slow down the application that requests the memory operation and the other applications. Reducing the number of misses may improve performance of the application and other applications.

According to an example implementation, after a number of misses associated with an instruction meets or exceeds a threshold, the instruction may cease interacting with the virtual memory and access the memory device directly. The memory device which the instruction directly accesses may include, for example, flash memory. The flash memory may be external to a computing system on which the application is running.

Figure 1:
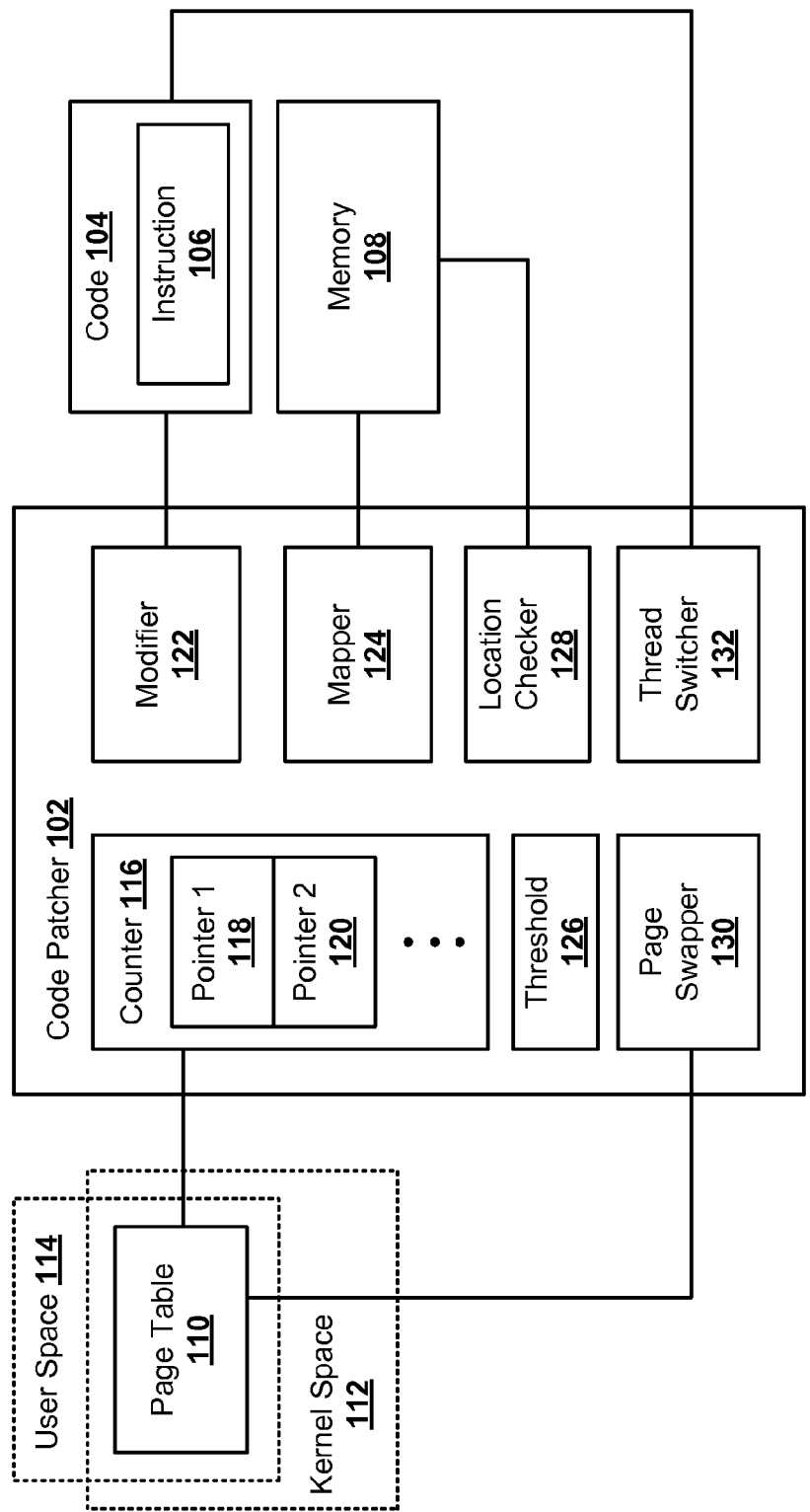
FIG. 1 is a block diagram showing a code patcher's interactions with code, memory, and a page table according to an example implementation.

FIG. 1 is a block diagram showing a code patcher's 102 interactions with code 104, memory 108, and a page table 110 according to an example implementation. The code patcher 102 may be an object or program embodied in software. The code patcher 102 may count a number of page faults associated with an instruction 106 included in the code 104 for an application. The code 104 may include multiple instructions executed by a computing system to run the application. While one instruction 106 is shown in FIG. 1, the code patcher 102 may maintain counts for multiple instructions in code for multiple applications. The instruction 106 may include an access to memory 108, such as a read or write function. The instruction 106 may, for example, include an operating system call for the operating system to perform the read or write function. The instruction 106 may be identified by an instruction pointer (IP). The IP may identify the instruction 106 within the code 104 using a number.

If the count of page faults for the instruction 106 meets or exceeds a threshold, the code patcher 102 may "patch" or modify the instruction. Based on the count meeting or exceeding the threshold, the code patcher 102 may also cause the page table 110 to move from an operating system and/or kernel space 112 to a user space 114, such as by providing an instruction to the operating system to move the page table 110 from the operating system and/or kernel space 112 to the user space 114. Based on the count meeting or exceeding the threshold, the code patcher 102 may switch the application from kernel mode to user mode, such as by providing an instruction to the operating system to switch the application from kernel mode to user mode. After the application that includes the instruction 106 has switched from kernel mode to user mode, the modified instruction 106 may access the memory 108 directly, and/or access a particular memory device (such as flash memory) directly, such as bypassing the page table 110 and/or operating system. The direct memory access may eliminate page faults and reduce memory latency, thereby improving performance of the corresponding application (as well as other applications using the memory 108).

The code patcher 102 may include a counter 116. The counter 116 may maintain a count of memory access misses associated with a given instruction (e.g., the instruction 106). While page faults are described herein, page faults are only one example of memory access misses. Memory access misses may also include cache misses in either a single-level cache, a multi-level cache, and/or a translation lookaside buffer (TLB), as non-limiting examples.

The counter 116 may maintain counts of memory access misses for multiple instructions. The counter 116 may increment or decrement a count each time a memory miss, such as a page fault, occurs in association with an instruction for which the counter 116 is maintaining a count. The counter 116 may maintain an absolute count of memory access misses, a count of memory access misses per time interval, and/or may refresh the count by reducing the count periodically and increasing the count for each memory miss in a leaky bucket scheme. The count may be approximate, such as in a count maintained in a hash table in which collisions are ignored. Each of the counts may be associated with an instruction pointer 118, 120 that identifies a respective instruction. While two instruction pointers 118, 120 and their associated counts are shown in FIG. 1, the counter 116 of the code patcher 102 may maintain counts for any number of instructions and corresponding identifying instruction pointers 118, 120.

The code patcher 102 may maintain a threshold 126 for modifying and/or patching the instruction 106 included in the code 104. The threshold 126 may be the same for all instructions for which the count of memory access misses is maintained, or the code patcher 102 may maintain a separate and/or different threshold for each instruction. The code patcher 102 may compare the count for an instruction pointer 118, 120 to its associated threshold 126. If the count meets or exceeds the threshold 126, the code patcher 102 may modify and/or patch the instruction 106. In other implementations, an instruction may be modified and/or patched only once the count for the instruction and/or for the instruction pointer exceeds its associated threshold.

The code patcher 102 may include a modifier 122. The modifier 122 may modify and/or patch the instruction 106 included in the code 104 for the application by, for example, changing the instruction's 106 memory access rights and/or method of accessing memory. The modifier 122 may change the instruction's 106 memory access so that the instruction 106 reads and/or writes the data directly from and/or to the memory 108, rather than calling an operating system function such as by first checking the page table 110 to translate a virtual memory address to a physical memory address of a memory device included in the memory 108. The modifier 122 may, for example, recompile and/or modify the binary-executable code of the program and/or instruction 106 so that the instruction 106 reads and/or writes the data directly from and/or to the memory 108, rather than calling the operating system function.

The code patcher 102 may also include a mapper 124. The mapper 124 may map data to the memory 108. The memory 108 may include multiple memory devices in a multi-level memory hierarchy. The memory 108 may include one or multiple levels of cache, random access memory (RAM), flash memory, and/or disk.

The mapper 124 may map data to different memory devices. The mapper 124 may determine, for example, which memory device within the memory 108 to store portions or blocks of data in. The mapper 124 may map the data in accordance with some or all features of an map function, according to an example implementation. Mapping may enable the application to manipulate a dataset that is larger than a single memory device, such as larger than the cache, RAM, or flash memory, by storing some of the data on memory devices that are lower in the memory hierarchy, such as flash memory or disk. As the application runs, the mapper 124 may change which memory device stores specified portions of data. The mapper 124 may, for example, store recently used data in higher levels and/or faster memory devices of the memory hierarchy, such as cache, and move less recently used data to lower levels and/or slower memory devices of the memory hierarchy, such as RAM, flash, and/or disk.

The code patcher 102 may also include a location checker 128. The location checker 128 may check to determine whether a memory location is present in physical memory. In an example implementation, when the count for an instruction pointer 118, 120 meets or exceeds its associated threshold 126, the location checker 128 may check to determine whether the data accessed by the instruction 106 identified by the instruction pointer 118, 120 is stored within a particular memory device within memory 108. The location checker 128 may, for example, determine whether the accessed data is stored within a flash memory device external to the computing device. The location checker 128 may determine whether the accessed data is stored within the flash memory device by checking, for example, the page table 110 and/or a table stored in user space 114. If the data is stored within the particular memory device, then the computing system may continue running as normal.

If the accessed data is not stored within the particular memory device, then the code patcher 102 may swap a page and/or block of memory including the accessed data out of a lower level memory device into the particular memory device, and the code patcher 102 may swap a page that does not include the accessed data, which may be an oldest page, out of the particular memory device and into a lower level memory device. The code patcher 102 may perform the swapping within user space 114. The user space 114 may, for example, request the kernel space 112 and/or operating system to evict a page to make room to swap the page including the accessed data into the particular memory device.

In one implementation, the code patcher 102 may include a page swapper 130. The page swapper 130 may be configured to swap memory pages, such as described above. This swapping of pages may enable reading and writing to the particular memory device, which may be the flash memory, within user space 114. The reading and writing to the particular memory device may use user-space queues provided by Intel NVM Express™, as a non-limiting example.

The page swapper 130 may also swap the page table 110 that includes data accessed by an instruction 106 and/or an application from kernel space 112 to user space 114 based on the count associated with the instruction pointer 118, 120 meeting or exceeding the threshold 126. Once the page table 110 is in user space, the instruction 106 may directly access the memory 108, bypassing the kernel space 112 and/or operating system.

The code patcher 102 may also include a thread switcher 132. The thread switcher 132 may switch threads of the instruction 106 for the application based on the count for the instruction 106 meeting or exceeding the threshold 126. The thread switcher 132 may switch a thread of the instruction 106 to a different context. The thread of the instruction 106 may be switched so that the instruction 106 directly accesses a particular memory device, such as flash memory, and then resumes executing.

The thread of the instruction 106 may be switched in user space 114. Queues in user space 114 may store the data for the threads and/or page tables associated with the memory accesses (i.e. reads and writes). A thread scheduler, in association with the thread switcher 132, may keep track of which reads and writes were performed simultaneously or concurrently with page swap operations. The thread switches of the reads and writes may be performed in user space 114 without going into the kernel space 112 and/or the operating system. Performing the thread switches and/or page swaps in user space 114 rather than in kernel space and/or the operating system may reduce system overhead. When the reads and writes are completed, the thread switcher 132 may switch the instruction 106 to the correct thread. Accordingly, because the page swapping is performed in user space 114, the thread switcher 132 may enable page swapping without clearing a translation lookaside buffer (TLB) (shown in FIG. 3) (which is in the kernel space 112).

Figure 2:
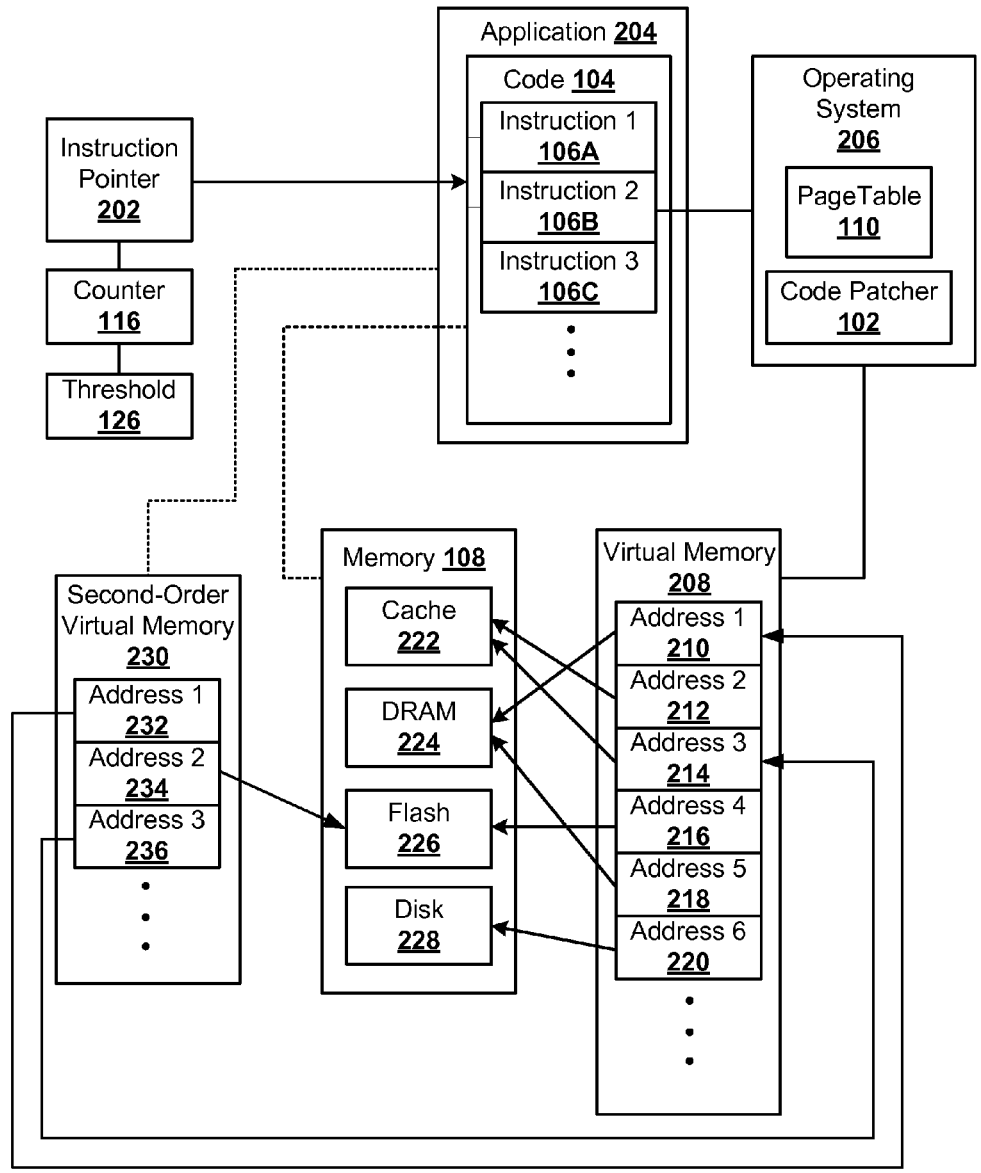
FIG. 2 is a block diagram showing interactions between an application, operating system, virtual memory, and physical memory according to an example implementation.

FIG. 2 is a block diagram showing interactions between an application 204, an operating system 206, a virtual memory 208, and a physical memory 108, according to an example implementation. An instruction pointer 202 (similar to the instruction pointers 118, 120 shown and described with respect to FIG. 1) may identify instructions in code 104 for the application 204. The instruction pointer 202 may be a component of the operating system 206, or may be separate from the operating system 206 and may reside, for example, in user space. While three instructions 106A, 106B, 106C, which may correspond to the instruction 106 shown in FIG. 1, are shown in FIG. 2, the code 104 may include many more than the three instructions 106A, 106B, 106C.

The instruction pointer 202 may be associated with the counter 116. The counter 116 may maintain a count of memory misses, such as page faults, associated with an instruction 106A, 106B, 106C identified by the instruction pointer 202. As discussed above, the counter 116 may maintain the count of memory misses as an absolute count, a count within a defined period of time, or a count beyond a refresh rate in a leaky bucket mechanism. A computing system (shown in FIG. 3) may compare the count maintained by the counter 116 to the threshold 126 for the associated instruction 106A, 106B, 106C. A component of the computing system, such as a processor, the operating system 206, and/or user space, may compare the count maintained by the counter 116 to the threshold 126.

The application 204 may include the code 104 and multiple instructions 106A, 106B, 106C. The application 204 may be one of many applications run on the computing system. The application 204 may include, for example, a web browser, video viewer, or game, as non-limiting examples.

The operating system 206 may control access to resources by the applications, including the application 204. The operating system 206 may, for example, allocate memory resources to the applications and/or determine when each application can access a central processing unit (CPU) of the computing system.

The operating system 206 may manage the page table 110. The page table 110 may enable applications to rely on virtual memory 208. The virtual memory 208 may enable the applications to access multiple memory devices using a single addressing scheme. The virtual memory 208 may map virtual memory addresses 210, 212, 214, 216, 218, 220 to addresses of memory devices included in the physical memory 108. In the example shown in FIG. 2, the physical memory 108 includes cache 222 (which may be a single-level or a multi-level cache), dynamic random access memory (DRAM) 224, flash memory 226, and a disk 228. This is merely an example memory hierarchy. In other implementations, the physical memory 108 may include more or fewer memory devices 222, 224, 226, 228 than shown in FIG. 2.

Each of the memory devices 222, 224, 226, 228 may have its own addressing scheme, and multiple addresses within its respective addressing scheme. The virtual memory addresses 210, 212, 214, 216, 218, 220 may map to addresses within the memory devices 222, 224, 226, 228 in a one-to-one correspondence. In the example shown in FIG. 2, virtual address 1 210 maps to a first address in DRAM 224, virtual address 2 212 maps to a first address in cache 222, virtual address 3 214 maps to a second address in cache 222, virtual address 4 216 maps to an address in flash memory 226, virtual address 5 218 maps to a second address in DRAM 224, and virtual address 6 220 maps to an address in disk 228.

Each of the virtual memory addresses 210, 212, 214, 216, 218, 220 may be associated with a same (e.g., fixed) amount of data, such as four kilobytes of data, as an example. The addresses of each of the addressing schemes of the memory devices 222, 224, 226, 228 may be associated with same or smaller amounts of data than the addresses of the virtual memory addresses 210, 212, 214, 216, 218, 220. If the addresses of each of the addressing schemes of the memory devices 222, 224, 226, 228 are associated with smaller amounts of data than the addresses of the virtual memory addresses 210, 212, 214, 216, 218, 220, then the virtual memory addresses 210, 212, 214, 216, 218, 220 may each be associated with a starting address of multiple blocks of memory of the memory devices 222, 224, 226, 228. Having the same amount of data associated with each virtual address may enable the application 204 to treat the memory devices 222, 224, 226, 228 as being operationally identical and virtually functioning as a single memory device, addressed by the virtual memory 208, such as for purposes of reading and writing data.

After the instruction(s) 106A, 106B, 106C has been patched and/or modified, the application 204 which includes the patched and/or modified instruction(s) 106A, 106B, 106C may perform memory access operations using a second-order virtual memory 230. The second-order virtual memory 230 may operate as a page table in user space 114 (shown in FIG. 1). The computing system may maintain the second-order virtual memory 230 in DRAM 224 or cache 222, as non-limiting examples. The second-order virtual memory 230 may have a second-order virtual memory addressing scheme recognized by the application 204. The second-order virtual memory 230 may map the addresses in the second-order virtual memory addressing scheme recognized by the application 204 to addresses of one or more memory devices in the memory 108 and to addresses in the virtual memory 208.

In an example embodiment, the second-order virtual memory 230 may map to addresses in the second-order virtual memory addressing scheme to addresses of only one memory device in the memory 108 and to addresses in the virtual memory 208. In the example shown in FIG. 2, the second-order virtual memory 230 maps addresses from the second-order virtual memory addressing scheme to the flash memory 226, but not to other memory devices in the memory 108, namely the cache 222, DRAM 224, or disk 228. In this example, second-order virtual address 1 232 maps to the virtual address 1 210 (which in turn maps to an address in DRAM 224), second-order virtual address 2 234 maps to an address in flash memory 226, and second-order virtual address 3 236 maps to virtual address 3 214 (which in turn maps to an address in cache 222). While three second order virtual memory addresses 232, 234, 236 are shown in the example second-order virtual memory 230 of FIG. 2, many more second-order virtual memory addresses may be included.

Figure 3:
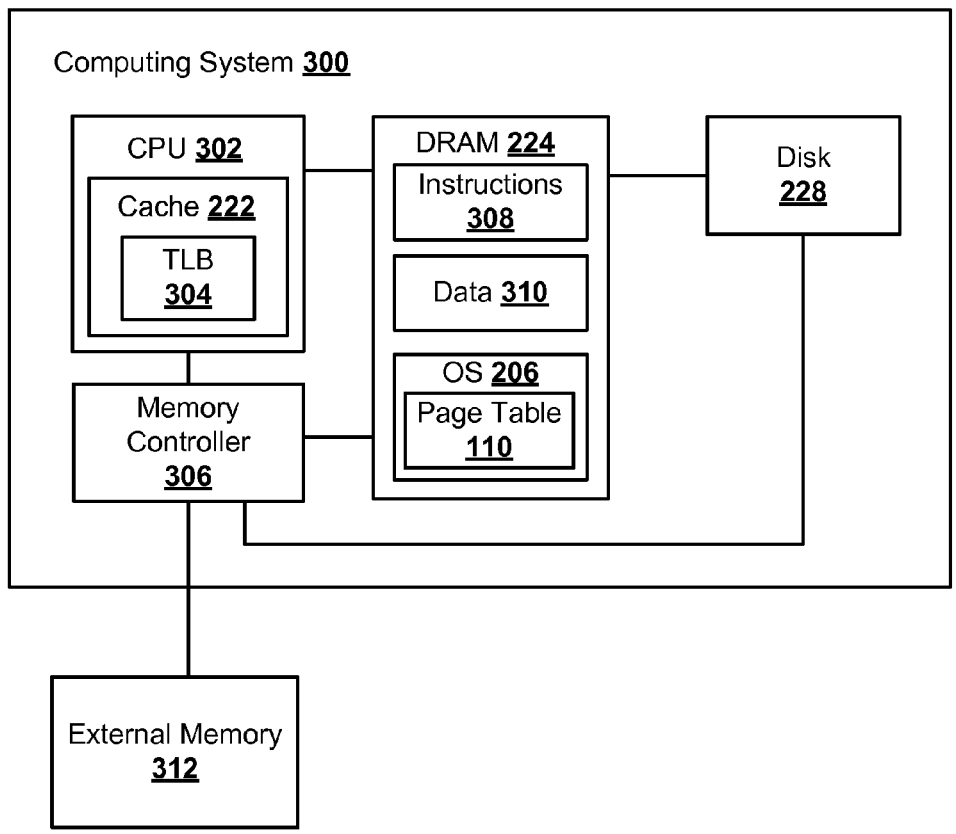
FIG. 3 is a block diagram showing a computing system and external memory according to an example implementation.

FIG. 3 is a block diagram showing a computing system 300 and external memory 312 according to an example implementation. The computing system 300 may include any computing device capable of executing instructions, such as a server, a personal computer, a laptop or portable computer, a netbook, a tablet computer, or a smartphone.

The computing system 300 may include a central processing unit (CPU) 302. The CPU 302 may read and write data from and to memory devices and execute instructions. The CPU 302 may also include the cache 222. The cache 222 may store a limited amount of data and provide fast memory access, such as in response to read and write operations. The cache 222 may include a single level or multiple levels. The cache 222 may store a translation lookaside buffer (TLB) 304. The cache 222 may store a single TLB 304 or multiple TLBs 304. Each TLB 304 may include a subset of the virtual addresses 210, 212, 214, 216, 218, 220 (shown in FIG. 2) and the addresses of the memory devices 222, 224, 226, 228 to which the virtual addresses 210, 212, 214, 216, 218, 220 are mapped. The subset of virtual addresses 210, 212, 214, 216, 218, 220 stored by each TLB 304 may be utilized by a single application 204.

The computing system 300 may include a memory controller 306. The memory controller 306 may control some or all of the memory operations within the computing system 300. The memory controller 306 may, for example, interface between the CPU 302 and the DRAM 224, disk 228, and an external memory 312 which may include the flash memory 226 shown in FIG. 2.

The computing system 300 may include the DRAM 224. The DRAM 224 may store instructions 308 executed by the CPU 302. The instructions 308 may include the instructions 106A, 106B, 106C of the code 104 for the application 204 shown in FIG. 2, as well as instructions and code for other applications. The instructions 308 may also include instructions for the operating system 206, such as instructions to perform functions described herein. The DRAM 224 may also include data 310 associated with applications executing on the computing system 300. The operating system 206 may store its instructions and data on the DRAM 224. The operating system 206 may also store the page table 110 on the DRAM 224. The computing system 300 may also include the disk 228. The disk 228 may include a magnetic disk such as a hard drive.

The computing system 300 may be coupled to external memory 312. The computing system 300 may be coupled to the external memory 312 via a wired or wireless interface, and/or via a network. The external memory 312 may include, for example, the flash memory 226 shown in FIG. 2. When a counter for an instruction reaches or exceeds an associated threshold, the instruction may access the external memory 312 directly, bypassing the operating system 206 and/or page table 110, such as described herein.

Figure 4:
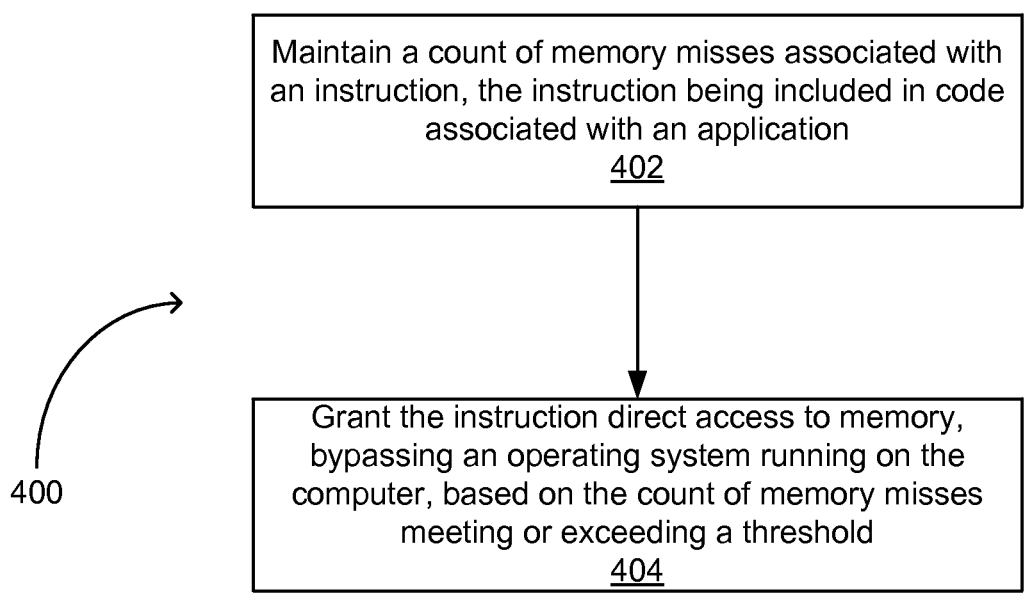
FIG. 4 is a flowchart showing a method according to an example implementation.

FIG. 4 is a flowchart showing a method according to an example implementation. According to this example, the method may include maintaining a count of memory misses associated with an instruction, the instruction being included in code associated with an application (402). The method may also include granting the instruction direct access to memory, bypassing an operating system running on the computer, based on the count of memory misses meeting or exceeding a threshold (404).

According to an example implementation, the maintaining the count may include maintaining the count of page faults associated with an instruction pointer (IP), the IP determining which instruction in the code is executed.

According to an example implementation, the memory misses may include page faults.

According to an example implementation, the granting the instruction direct access to memory may include switching a page table used by a program executing the instruction from an operating system to user space.

According to an example implementation, the granting the instruction direct access to memory may include granting the instruction direct access to memory external to the computing device.

According to an example implementation, the granting the instruction direct access to memory may include granting the instruction direct access to flash memory external to the computing device.

According to an example implementation, the granting the instruction direct access to memory may include switching a thread of the instruction.

According to an example implementation, the method may further include determining whether data accessed by the instruction is stored within a particular memory device. The granting the instruction direct access to memory may include granting the instruction direct access to memory, bypassing the operating system running on the computer, based on the count of memory misses meeting or exceeding the threshold, and determining that the data accessed by the instruction is not stored within the particular memory device.

Figure 5:
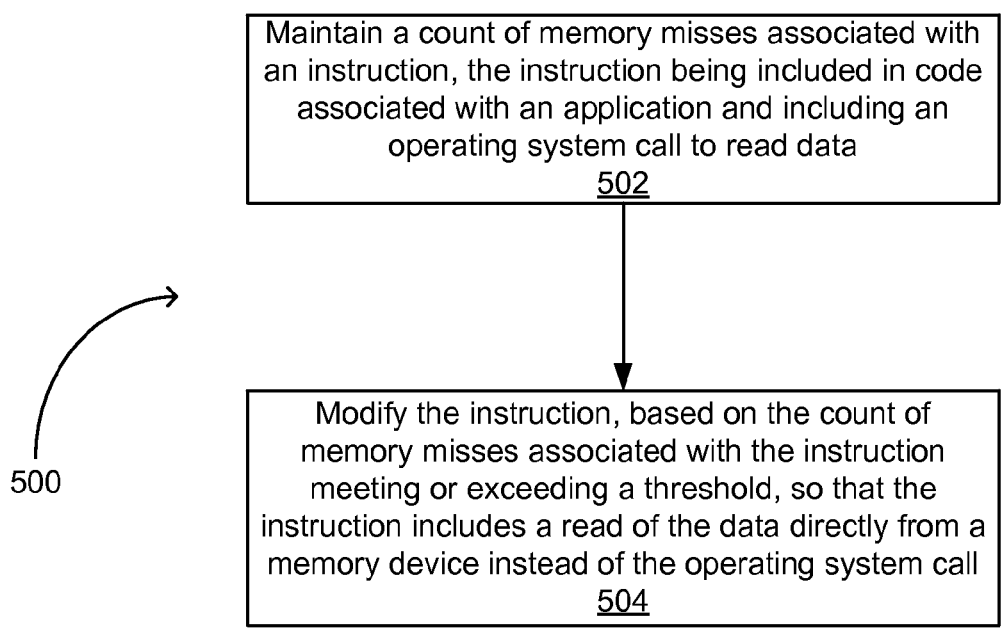
FIG. 5 is a flowchart showing a method according to another example implementation.

FIG. 5 is a flowchart showing a method according to another example implementation. According to this example, the method may include maintaining a count of memory misses associated with an instruction, the instruction being included in code associated with an application and including an operating system call to read data (502). The method may also include modifying the instruction, based on the count of memory misses associated with the instruction meeting or exceeding a threshold, so that the instruction includes a read of the data directly from a memory device instead of the operating system call (504).

According to an example implementation, the modifying the instruction may include modifying the instruction so that the instruction includes a read of the data directly from a flash memory device.

According to an example implementation, the modifying may include recompiling code, the code including the instruction, so that the instruction includes a read of the data directly from the memory device instead of the operating system call, based on the count of memory misses associated with the instruction meeting or exceeding the threshold.

According to an example implementation, the modifying may include patching a binary code version of the instruction.

According to an example implementation, the modifying may include switching a thread of the instruction.

Figure 6:
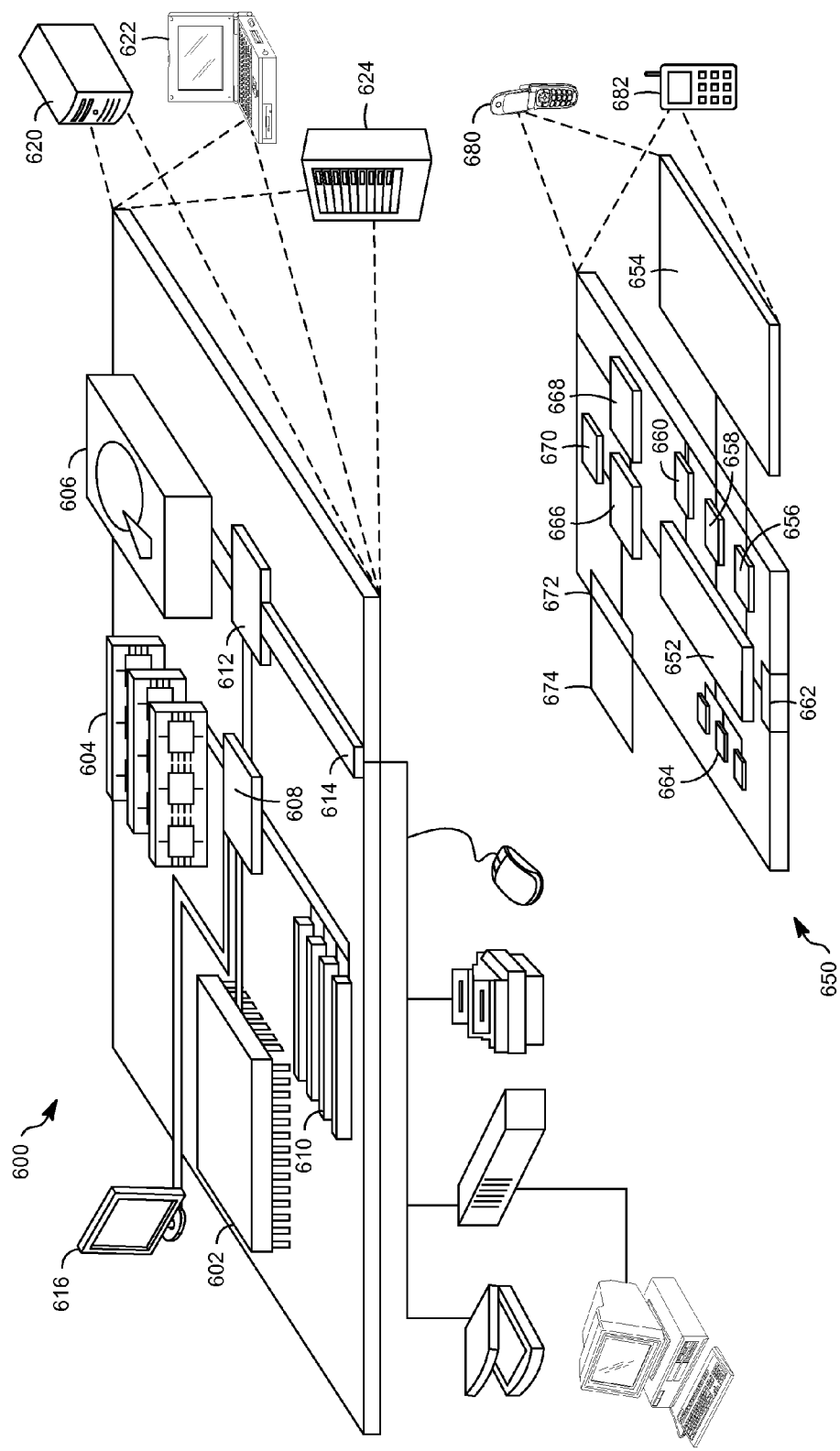
FIG. 6 shows an example of a generic computer device and a generic mobile computer device, which may be used with the techniques described here.

FIG. 6 shows an example of a generic computer device 600 and a generic mobile computer device 650, which may be used with the techniques described here. Computing device 600 is intended to represent various forms of digital computers, such as laptops, desktops, workstations, personal digital assistants, servers, blade servers, mainframes, and other appropriate computers. Computing device 650 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a volatile memory unit or units. In another implementation, the memory 604 is a non-volatile memory unit or units. The memory 604 may also be another form of computer-readable medium, such as a magnetic or optical disk.

The storage device 606 is capable of providing mass storage for the computing device 600. In one implementation, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 604, the storage device 606, or memory on processor 602.

The high speed controller 608 manages bandwidth-intensive operations for the computing device 600, while the low speed controller 612 manages lower bandwidth-intensive operations. Such allocation of functions is exemplary only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 can execute instructions within the computing device 650, including instructions stored in the memory 664. The processor may be implemented as a chipset of chips that include separate and multiple analog and digital processors. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT LCD (Thin-Film-Transistor Liquid Crystal Display) or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provide in communication with processor 652, so as to enable near area communication of device 650 with other devices. External interface 662 may provide, for example, for wired communication in some implementations, or for wireless communication in other implementations, and multiple interfaces may also be used.

The memory 664 stores information within the computing device 650. The memory 664 can be implemented as one or more of a computer-readable medium or media, a volatile memory unit or units, or a non-volatile memory unit or units. Expansion memory 674 may also be provided and connected to device 650 through expansion interface 672, which may include, for example, a SIMM (Single In Line Memory Module) card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provide as a security module for device 650, and may be programmed with instructions that permit secure use of device 650. In addition, secure applications may be provided via the SIMM cards, along with additional information, such as placing identifying information on the SIMM card in a non-hackable manner.

The memory may include, for example, flash memory and/or non-volatile random access memory (NVRAM memory), as discussed below. The NVRAM, if included in the memory 108, may add another level or rank to the memory hierarchy, such as between the DRAM 224 and flash 226. Other types of memory, such as magnetoresistive random-access memory (MRAM), phase-change memory (PCM), and/or resistive random access memory (RRAM), may also be included in the memory hierarchy. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, or memory on processor 652, that may be received, for example, over transceiver 668 or external interface 662.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, WiFi, or other such transceiver (not shown). In addition, GPS (Global Positioning System) receiver module 670 may provide additional navigation- and location-related wireless data to device 650, which may be used as appropriate by applications running on device 650.

Device 650 may also communicate audibly using audio codec 660, which may receive spoken information from a user and convert it to usable digital information. Audio codec 660 may likewise generate audible sound for a user, such as through a speaker, e.g., in a handset of device 650. Such sound may include sound from voice telephone calls, may include recorded sound (e.g., voice messages, music files, etc.) and may also include sound generated by applications operating on device 650.

The computing device 650 may be implemented in a number of different forms, as shown in the figure. For example, it may be implemented as a cellular telephone 680. It may also be implemented as part of a smart phone 682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the embodiments of the invention.

What is claimed is:

1. A non-transitory computer-readable storage medium comprising instructions stored thereon that, when executed by at least one processor, are configured to cause a computing system to at least:
   maintain a count of memory misses associated with an instruction, the instruction being included in code associated with an application; and
   grant the instruction direct access to memory, bypassing an operating system running on the computer, based on the count of memory misses meeting or exceeding a threshold.

2. The storage medium of claim 1, wherein the maintaining the count includes maintaining the count of page faults associated with an instruction pointer (IP), the IP determining which instruction in the code is executed.

3. The storage medium of claim 1, wherein the memory misses include page faults.

4. The storage medium of claim 1, wherein the granting the instruction direct access to memory includes switching a page table used by a program executing the instruction from an operating system to user space.

5. The storage medium of claim 1, wherein the granting the instruction direct access to memory includes granting the instruction direct access to memory external to the computing device.

6. The storage medium of claim 1, wherein the granting the instruction direct access to memory includes granting the instruction direct access to flash memory external to the computing device.

7. The storage medium of claim 1, wherein the granting the instruction direct access to memory includes switching a thread of the instruction.

8. The storage medium of claim 1, further comprising:
   determining whether data accessed by the instruction is stored within a particular memory device,
   wherein the granting the instruction direct access to memory includes granting the instruction direct access to memory, bypassing the operating system running on the computer, based on:
      the count of memory misses meeting or exceeding the threshold; and
      determining that the data accessed by the instruction is not stored within the particular memory device.

9. A non-transitory computer-readable storage medium comprising instructions stored thereon that, when executed by at least one processor, are configured to cause a computing system to at least:
   maintain a count of memory misses associated with an instruction, the instruction being included in code associated with an application and including an operating system call to read data; and
   modify the instruction, based on the count of memory misses associated with the instruction meeting or exceeding a threshold, so that the instruction includes a read of the data directly from a memory device instead of the operating system call.

10. The storage medium of claim 9, wherein the modifying the instruction includes modifying the instruction so that the instruction includes a read of the data directly from a flash memory device.

11. The storage medium of claim 9, wherein the modifying includes recompiling code, the code including the instruction, so that the instruction includes a read of the data directly from the memory device instead of the operating system call, based on the count of memory misses associated with the instruction meeting or exceeding the threshold.

12. The storage medium of claim 9, wherein the modifying includes patching a binary code version of the instruction.

13. The storage medium of claim 9, wherein the modifying includes switching a thread of the instruction.

14. An apparatus comprising:
at least one processor; and
at least one non-transitory computer-readable storage medium comprising instructions stored thereon that, when executed by at the least one processor, are configured to cause the apparatus to at least:
maintain a count of memory misses associated with an instruction, the instruction being included in code associated with an application; and
grant the instruction direct access to memory, bypassing an operating system running on the computer, based on the count of memory misses meeting or exceeding a threshold.

15. The apparatus of claim 14, wherein the memory misses include page faults.

16. The apparatus of claim 14, wherein the granting the instruction direct access to memory includes switching a page table used by a program executing the instruction from an operating system to user space.

17. The apparatus of claim 14, wherein the granting the instruction direct access to memory includes granting the instruction direct access to memory external to the computing device.

18. The apparatus of claim 14, wherein the granting the instruction direct access to memory includes granting the instruction direct access to flash memory external to the computing device.

19. The apparatus of claim 14, wherein the granting the instruction direct access to memory includes switching a thread of the instruction.

20. The apparatus of claim 14, further comprising:
determining whether data accessed by the instruction is stored within a particular memory device,
wherein the granting the instruction direct access to memory includes granting the instruction direct access to memory, bypassing the operating system running on the computer, based on:
the count of memory misses meeting or exceeding the threshold; and
determining that the data accessed by the instruction is not stored within the particular memory device.

\* \* \* \* \*

UNITED STATES PATENT AND TRADEMARK OFFICE
CERTIFICATE OF CORRECTION

| | | |
|---|---|---|
| PATENT NO. | : 9,213,658 B1 | Page 1 of 1 |
| APPLICATION NO. | : 13/771960 | |
| DATED | : December 15, 2015 | |
| INVENTOR(S) | : Daniel Ari Ehrenberg | |

It is certified that error appears in the above-identified patent and that said Letters Patent is hereby corrected as shown below:

Claims

In column 15, line 9, in claim 14, delete "at the least" and insert -- the at least --, therefor.

Signed and Sealed this
Seventeenth Day of May, 2016

Michelle K. Lee
*Director of the United States Patent and Trademark Office*